G. W. PORTER.
Carbureter.
No. 64,361.           Patented April 30, 1867.
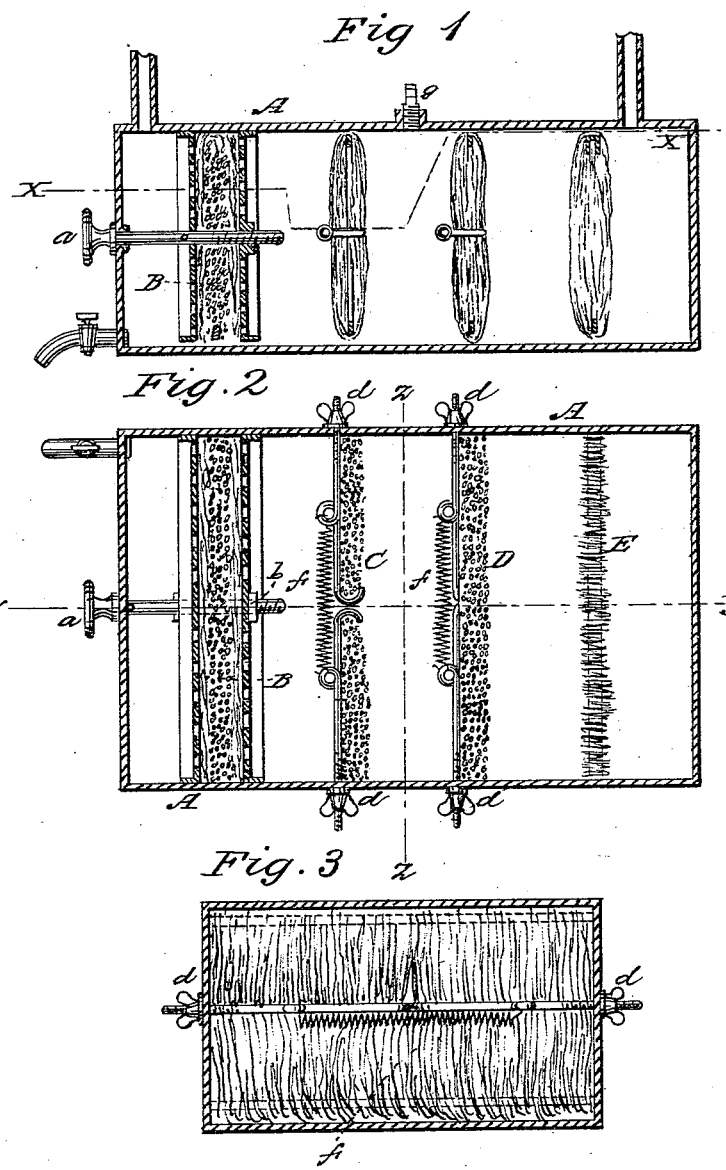

United States Patent Office.

GEORGE W. PORTER, OF BOSTON, MASSACHUSETTS.

Letters Patent No. 64,361, dated April 30, 1867.

---

IMPROVED APPARATUS FOR CARBURETTING GAS AND AIR.

---

*The Schedule referred to in these Letters Patent and making part of the same.*

---

TO ALL WHOM IT MAY CONCERN:

Be it known that I, GEORGE W. PORTER, of Boston, in the county of Suffolk, and State of Massachusetts, have invented a new and useful improvement in Carburetting Gas and regulating its flow; and I do hereby declare that the following is a full, clear, and exact description thereof, which will enable others skilled in the art to make and use the same, reference being had to the accompanying drawings, forming part of this specification.

This invention relates to a method of charging and enriching coal gas with a hydrocarbon liquid, and regulating its flow; and the invention consists in passing the gas through a series of walls or partitions composed of capillary substances, and also in regulating the flow of the gas through such partitions by increasing the density or altering the condition of the walls or partitions through which it passes, as will be hereinafter described.

Figure 1 represents a vertical central section of my apparatus through the line $y\, y$ of fig. 2.

Figure 2 is a top or plan view, partly in section, or through the line $x\, x$ of fig. 1.

Figure 3 is a cross-section through the line $z\, z$ of fig. 2.

Similar letters of reference indicate like parts.

A represents a box formed of any suitable metal, size, and form, with the space between the top and bottom not too great to allow of the perfect saturation of the capillary material with the contained fluid. Fig. 1 represents the height of the box. B represents one of the partitions in the box through which the gas is made to pass. This partition is designed as a regulator, and it is so formed that by turning a thumb-screw, $a$, on the outside, the elastic capillary substance is compressed (when desired) between two metallic perforated plates, as seen in the drawing. The nut $b$ on the end of the screw is fixed to the plate, and the plates are drawn together when there is a too free flow of gas through the partitions. This, of course, is done without in any manner disturbing the interior arrangement or operation of the apparatus. C, D, and E represent partitions in the vessel. These partitions, like the interior portion of B, are composed of candle wicking or any other good capillary material, placed upon suitable frames, which frames are attached to the sides of the box, or placed in a fixed position in the box or vessel, so that the lower portion shall be submerged in the carburetting liquid. In case the gas does not pass sufficiently free through the partitions, I provide means to produce a breach in them, and for that purpose I introduce hooks which take hold of the capillary substance near the middle from each side of the vessel. The shank ends of the hooks extend through the sides, and have thumb-nuts on them, as seen at C, fig. 2, by which an opening or breach is made in the partition when the thumb-nuts $d$ are turned up. When the thumb-nuts are loosened, the parts of the partition are brought together by a spiral spring, $f$, which is attached by each end to the two hooks, as seen in the drawing. $g$ is an aperture through which the carburetting liquid is introduced. $h$ is a faucet by which it is withdrawn when necessary. $j$ and $k$ are tubes for the admission and discharge of the gas. The condition or density of the partitions will depend upon the pressure of the gas when the apparatus is in operation. This density is varied by the screws to suit the pressure, as before mentioned. The partitions may be supported by perforated tin or other metallic plates, and the number of partitions in a vessel may be varied, but should be sufficient to absorb and hold enough of the hydrocarbon liquid to thoroughly load the passing gas with its illuminating properties.

Having thus described my invention, what I claim as new, and desire to secure by Letters Patent, is—

1. The construction and arrangement of the hooks in the side of the box A, their inner ends pointing in opposite directions, retained by means of the spiral springs $f$, and capable of being adjusted, whereby a breach is made in the capillary substance, as and for the purpose specified.

2. The construction and arrangement within the box A of the perforated plates, adjusted by means of the thumb-screw $a$, whereby the capillary substance is compressed or released, as herein set forth, for the purpose specified.

GEORGE W. PORTER.

Witnesses:
 DAVID P. KIMBALL,
 GEO. H. PRESTON.